July 10, 1956
H. E. POUELL
2,754,112
VEHICLE COIL SPRING TENSION RING
Filed Dec. 12, 1952
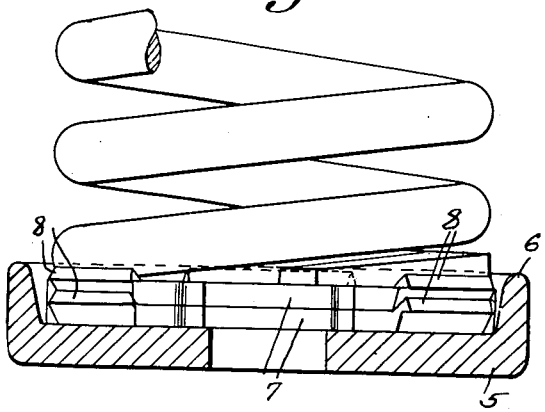
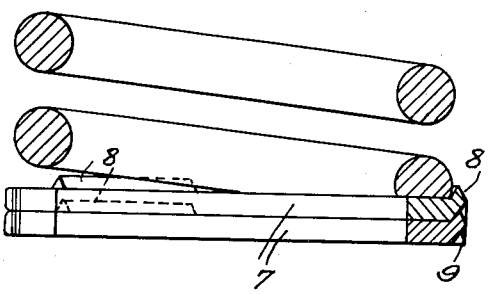
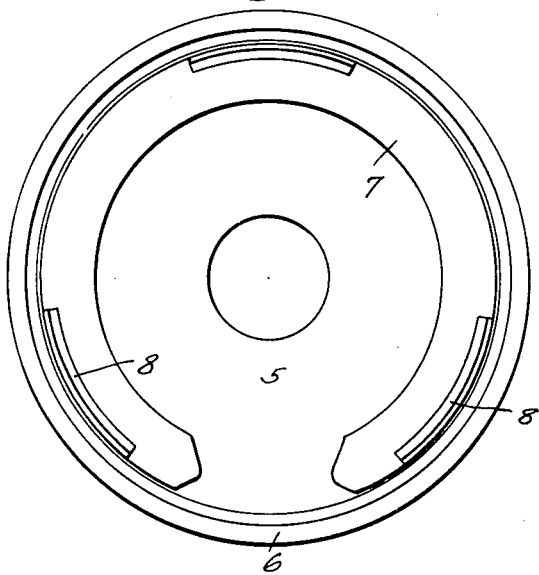
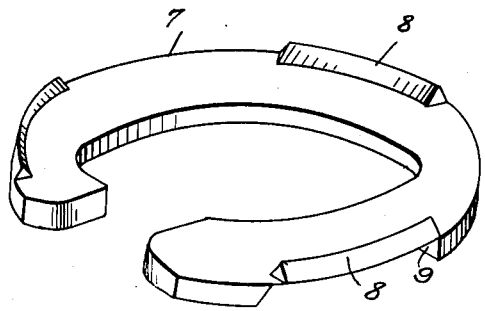
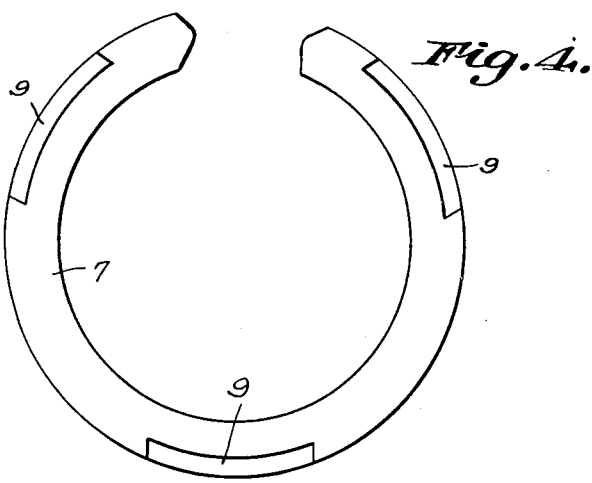
H. E. Powell
INVENTOR
BY *CA Snow & Co.*
ATTORNEYS.

United States Patent Office 2,754,112
Patented July 10, 1956

2,754,112
VEHICLE COIL SPRING TENSION RING

Harry E. Pouell, Logansport, Ind., assignor to Pouell Manufacturing Company, a corporation of Indiana Application December 12, 1952, Serial No. 325,597

1 Claim. (Cl. 267—60)

This invention relates to a coil spring suspension unit, especially designed for use in connection with motor vehicles for adding rigidity to driving units, wherein the drive is through the springs, the primary object of the invention being to provide a coil spring suspension in which shims in the form of split rings, may be secured in the usual coil spring seats of a motor vehicle chassis for restoring tension to the springs, when the springs lose a degree of tension, due to wear.

An important object of the invention is to provide split ring shims which may be readily and easily inserted on the spring seats, between the spring seats and lowermost coils of the springs, eliminating the necessity of dismantling the running gear in order to mount the shims.

Still another important object of the invention is to provide shims having interengaging members for securely holding the shims in place against lateral movement with respect to each other, the interengaging members of the shims being such that they will prevent the springs from separating from the shims during the rebound of the springs.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is an elevational view partly in section, showing a number of shims, constructed in accordance with the invention, as positioned between the lower coil of a coil spring and its seat.

Fig. 2 is an elevational view illustrating a section of a coil spring with shims resting against the lower coil of the spring.

Fig. 3 is a plan view illustrating the shim as resting in a spring seat.

Fig. 4 is a bottom plan view of a shim.

Fig. 5 is a perspective view of a shim.

Referring to the drawing in detail, the reference character 5 indicates a conventional spring seat which is provided with the usual upwardly extended annular flange 6 in which the lower coil of a coil spring usually rests.

The device forming the subject matter of the present invention, embodies a shim which is of split ring formation and indicated generally by the reference character 7, the shim being substantially wide. Extending upwardly from the upper surface of the shim, and arranged in predetermined spaced relation with respect to each other, are ribs 8 which are formed by the extrusion method with the result that recesses 9 are formed in the lower surface of the shim directly opposite to the ribs 8 so that when these shims are positioned one upon another, the ribs of one shim will rest in the recesses of the adjacent upper shim.

In order that the shims may be positioned with facility, the inner surfaces of the ribs 8 are beveled outwardly towards the upper edges thereof while the surfaces of the recesses are beveled outwardly towards the outer edges thereof, the beveled surfaces operating as guides to guide the ribs into the recesses.

It will of course be understood that the outer surface of the lowermost coil of a coil spring is flat to present rectangular shoulders that fit against the ribs of the shim with which it engages so that the spring will be held against displacement with respect to the uppermost shim, during the rebound of the spring.

From the foregoing it will be seen that due to the construction of the shim forming the subject matter of the present invention, a number of these shims may be positioned under the lowermost coil of a coil spring tensioning the coil spring when it is desired to increase the tension of the spring when the spring becomes worn and the tension is reduced due to natural wear.

It will also be noted that due to the construction of the shim, a number of these shims may be inserted, the ribs and recesses of adjacent shims interengaging to hold the shims against lateral movement with respect to each other and at the same time prevent displacement of one shim with respect to another under strains directed thereto during ordinary use.

In order to position the shims, it is only necessary to jack up the vehicle relieving the tension of the springs. The shims may now be forced between the lowermost coil of a coil spring and the seat in which the lowermost coil rests while in use.

Having thus described the invention, what is claimed is:

A spring tensioning means adapted for positioning under coiled springs, comprising a plurality of superposed shims on which a coiled spring rests, each shim comprising a flat body of substantially horse shoe shape, spaced ribs extending outwardly from the upper surface of said body and forming continuations of the edge of said body, said body also having elongated recesses formed in the flat lower surface thereof directly under said ribs with open outer edges, the flat surfaces of one shim forming a seat for the adjacent shim, the ribs and recesses of adjacent shims interengaging, holding the shims against movement with respect to each other under the spring with which the shims are used, and said ribs extending outwardly from the upper surface of the uppermost shim engaging the lowermost coil of the spring mounted thereon preventing lateral movement of said spring with respect to the shims.

References Cited in the file of this patent

UNITED STATES PATENTS

| | | |
|---|---|---|
| 1,141,264 | Price | June 1, 1915 |
| 2,527,524 | Brent | Oct. 31, 1950 |
| 2,610,847 | Fox | Sept. 16, 1952 |